Feb. 19, 1952  B. C. HAMILTON  2,586,222
BUSHING REPLACER

Filed Jan. 17, 1950

INVENTOR.
BERT C. HAMILTON
BY
ATTORNEY

Feb. 19, 1952     B. C. HAMILTON     2,586,222
BUSHING REPLACER
Filed Jan. 17, 1950     2 SHEETS—SHEET 2
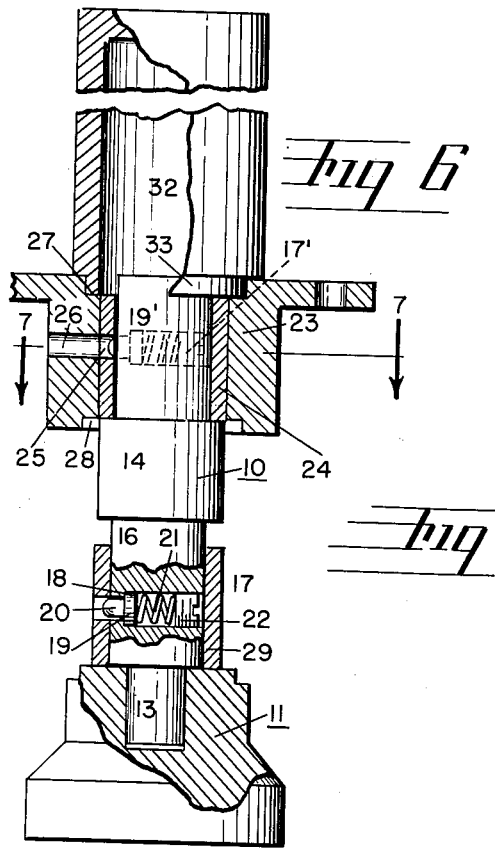
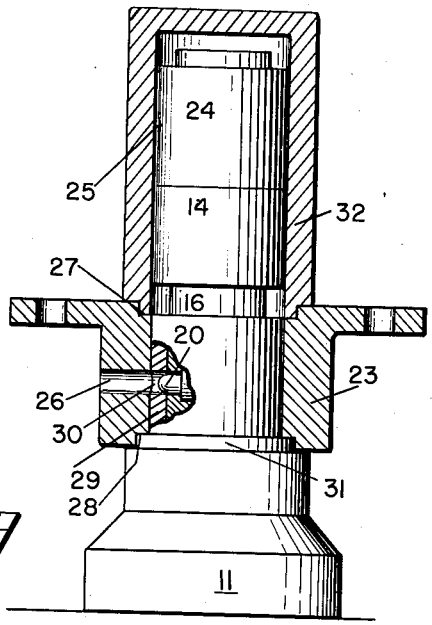
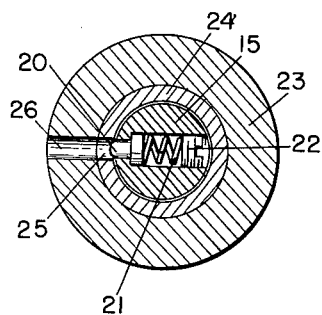
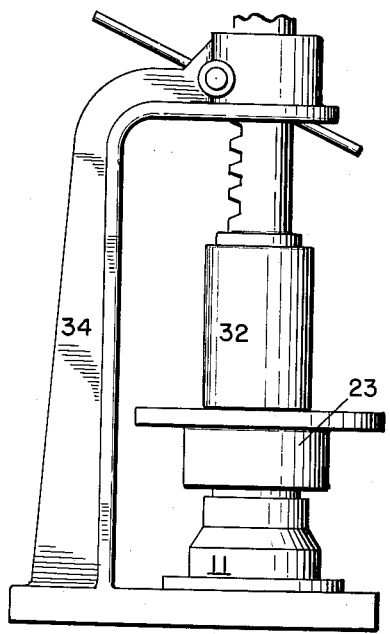
INVENTOR.
BERT C. HAMILTON
BY
ATTORNEY Patented Feb. 19, 1952

2,586,222

UNITED STATES PATENT OFFICE 2,586,222

BUSHING REPLACER

Bert C. Hamilton, La Grande, Oreg., assignor to Hamilton Tool Co. Inc., La Grande, Oreg., a corporation of Oregon Application January 17, 1950, Serial No. 139,043

2 Claims. (Cl. 29—283).

This invention relates to the replacing of tubular or split bushings in bearings, and, more specifically, relates to a device which can be operated to remove an old bushing from a bearing and place a new bushing in the bearing.

This application is a continuation in part of my pending application, Serial No. 20,438, filed under date of April 12, 1948, and entitled "Means for Removing and Replacing Tubular Bushings."

The principal object of the present invention similarly is to provide improved or simple means for removing an old bushing and replacing the old bushing with a new bushing in a single operation and in a practical manner.

It is generally customary, in a bearing with an inner tubular or split bushing, to provide an oil hole in the wall of the bearing and a corresponding oil hole in the cylindrical wall of the bushing in order to permit lubricating oil to be admitted into the interior of the bushing when in use. In such case care must be taken, when setting the new bushing in place in the bearing, to have the oil holes of bearing and bushing in proper registration with each other.

An additional special object of the present invention is to provide an improved bushing replacing means in which the possibility of having these oil holes out of registration, when the new bushing is inserted in the bearing, will be practically eliminated.

In the accompanying drawings:

Fig. 6 is an elevation similar to Fig. 4 but, in addition, showing a bearing, with the old bushing therein, positioned on the post member for removal of the old bushing and subsequent placing of the new bushing in the bearing, and also showing the cap member in position above the bearing, with parts of the various members being shown in section for the sake of clarity;

Fig. 7 is a section on line 7—7 of Fig. 6;

Fig. 8 is an elevation similar to Fig. 6 but showing the position of the bearing and bushings and cap member at the end of the bushing replacing operation; and Fig. 9 is an elevation showing the various members in the same relative position as Fig. 8 and illustrating the employment of a simple press as a means for operating my bushing replacer.

Figure 2:
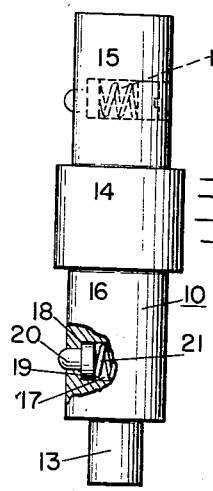
Fig. 2 is an elevation of a post member of my bushing replacer, a portion of the post member being shown in section.
Figure 1:
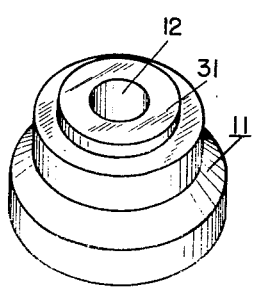
Fig. 1 is a perspective view of the base member of my bushing replacer.

My device includes post member 10, shown in Fig. 2, which is removably set up in the base member 11, shown in Fig. 1. The base member 11 consists of a block of solid metal preferably shaped substantially as shown in Figs. 1 and 6. A central cylindrical cavity 12 is formed in the top of the base member 11 of the proper size to fit the bottom cylindrical stem 13 of the post member 10, so that the post member can be set up in the base member and held by the base member in upright vertical position, while permitting the post member to be readily removed from the base member.

The post member 10 is a solid metal member having different cylindrical portions. In addition to the base cylindrical stem 13 of reduced diameter the post member comprises a central cylindrical shoulder portion 14 of largest diameter and upper and lower cylindrical sections 15 and 16 of the same diameter and located on opposite sides of the enlarged central shoulder portion 14. The diameter of these upper and lower cylindrical sections 15 and 16 is slightly less than the internal diameter of the bushing to be replaced, and the diameter of the central shoulder portion 14 is slightly less than the external diameter of the bushing, or, in other words, is slightly less than the diameter of the bearing for the bushing. A channel 17 (Fig. 2) extends diametrically through the lower section 16 of the post member 10. The diameter of the channel 17 is reduced near one end so as to produce an internal annular shoulder 18. The cylindrical wall of the channel 17 is threaded at the opposite end for a substantial distance inwardly. A stud 19, having an inner enlarged portion of slightly less diameter than the major diameter of the channel 17, and having a rounded outer knob 20 of slightly less diameter than the reduced diameter portion of the channel 17, is slidably mounted in the channel 17. A coil spring 21 is placed in the channel 17 with one end in engagement with the inner end of the stud 19 and the other end in engagement with a threaded plug 22 which is screwed into the threaded wall of the channel 17 and by which the tension of spring 21 can be slightly adjusted. The rounded outer end of the knob 20 of the stud 19, when the stud is held in its normal outermost position in engagement with the shoulder 18, extends a slight distance beyond the cylindrical surface of the section 16 of the post member 10 as shown in Fig. 2, but a slight inward thrust against the outer rounded end of the knob 20 will cause the stud to move inwardly against the force of the spring 21.

A second channel 17', similar to the channel 17, extends diametrically through the upper section 15 of the post member 10 and a similar stud 19', with a similar rounded external knob-like portion, is similarly mounted in this second channel 17'. The axes of both channels 17 and 17' lie in the same plane passing through the longitudinal axis of the post member 10, and both channels are spaced the same distance above the lower ends of their cylindrical sections 16 and 15 respectively of the post member 10.

In Figs. 6, 7, 8 and 9 the reference character 23 indicates a member having a bearing in which replacement of the bushing is required, as, for example, a bearing member common to certain types of automotive vehicle engines. In Figs. 6 and 7 the old bushing, which must first be removed from the bearing before the new bushing can be installed, is indicated by the reference character 24, and is shown in the bearing with the oil hole 25 of the bushing in the customary proper registration with the oil hole 26 of the bearing. In the particular bearing member 23 illustrated, the bearing itself (Fig. 6) is set in from the two faces of the bearing member by the annular recesses 27 and 28 and the bearing bushing in such case of course does not extend out beyond the inner walls of the annular recesses.

Figure 4:
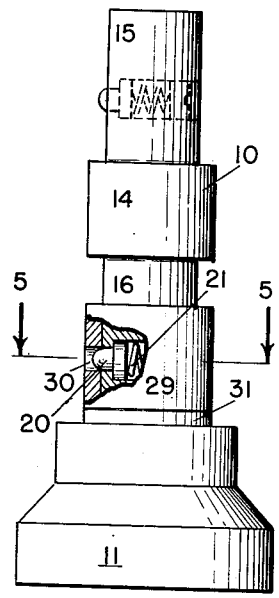
Fig. 4 is an elevation showing the post member set up in the base member and the new bushing positioned on the post member in preparation for the bushing replacing operation.

In the operation of removing and replacing the bearing bushing the new bushing to be inserted in the bearing is first slipped over the lower section 16 of the post member 10 and the post member is then set up in the base member 11, as shown in Fig. 4, the new bushing being indicated by the reference character 29. As the new bushing 29 is slipped on the lower section 16 of the post member 10 the bushing will first push the knob 20 inwardly and the bushing is then moved on the post member until the spring-controlled knob 20 engages the oil hole 30 of the bushing 29. The bushing 29 then remains in this position.

The base member 11, in the particular form in which I have illustrated my device, has a raised ring portion 31 (Figs. 1 and 4) on its top face, and when the post member, with the new bushing 29 in place thereon, is set up in the base member, the new bushing will rest on this raised ring portion 31, as shown in Fig. 4 when the bushing is properly positioned.

Figure 3:
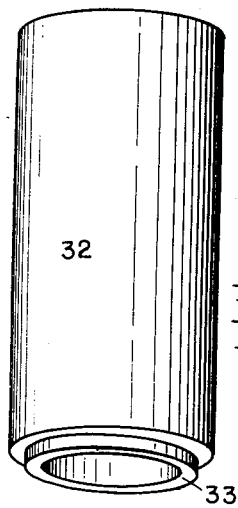
Fig. 3 is a perspective view of the cap member used with my bushing replacer, through the intermediary of which the necessary force is applied for removing the old bushing and setting in the new bushing.
Figure 5:
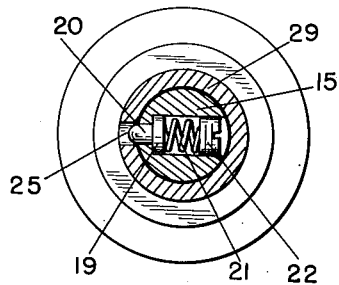
Fig. 5 is a section on line 5—5 of Fig. 4.

When the post member 10 has been set up in the base, with the new bushing 29 in proper position, the member 23, with the old bushing 24 in the bearing, is slid down over the upper section 15 of the post member until the bushing 24 contacts the top of the central raised shoulder portion 14 of the post member. At the same time the member 23 is rotated with respect to the post, if necessary (Fig. 6) until the oil hole 25 in the old bushing 24 is engaged by the knob of the stud 19'. The bearing member 23 is now in proper position for the bushing replacement. In order to transmit the necessary force for causing the old bushing to be pushed out of the bearing and the new bushing to be pushed into the bearing, I provide a cap member 32 (Fig. 3) against the top of which such necessary force is applied. The cap member 32 has a cylindrical wall, the inside diameter of which is slightly greater than the diameter of the bearing in member 23. In the case of the particular bearing member illustrated, with the bearing recessed, the wall of the cap member terminates in a bottom annular flange 33 of reduced outside diameter, the outside perimeter of this bottom flange being of slightly less diameter than the recess 27 in the bearing member 23.

When the bearing member 23 has been set in proper position on the post member 10 as previously described, the cap member 32 is placed on the bearing member 23 as shown in Fig. 6 with the bottom flange 33 of the cap seated in the annular recess 27 of the bearing member. Finally force is applied to the top of the cap member 32 until the bearing member 23 is pushed down on the post to the base 11 and into the position illustrated in Fig. 8. The outside perimeter of the raised ring portion 31 of the base member has a diameter slightly less than the diameter of the recess 28 in the bottom face of the bearing member 23 so that when the bearing member 23 is pushed down into the position illustrated in Fig. 8 the top ring portion 31 of the base member will enter the recess 28 of the bearing member 23 and cause the new bushing 29 to be properly positioned with respect to the recessed bearing. When the bearing member 23 has been pushed into the position illustrated in Fig. 8, and the new bushing 29 is thus properly positioned in the bearing, the old bushing 24 will remain at the top of the post member as shown in Fig. 8. The cap member 32 is then lifted off the post member, the post member is pulled up from the base member and out of the new bushing and bearing member 23, and the old bushing 24 is slid off the top of the post, which completes the operation.

The force employed to push the cap member 32 and bearing member 23 from the position of Fig. 6 to that shown in Fig. 8 may be applied by any suitable means. Hammer blows can be used for this purpose, but preferably means such as a press, jack, or screw clamp is employed. Fig. 9 illustrates a simple form of press 34 being used for the purpose of forcing the cap 32 downwardly. Only a very few minutes need be required for the entire operation.

One of the main difficulties encountered in replacing bushings in the customary and laborious methods heretofore followed in garages and machine shops has been in getting the oil hole of the new bushing brought properly into registration with the oil hole of the bearing. Damaged bushings and waste of time have frequently occurred on this account. However, with my improved bushing replacing both the new bushing and the bearing member with the old bushing therein are quickly and easily kept with the oil holes in accurate vertical alignment, and failure to position the new bushing in the bearing with its oil hole in proper registration with the bearing oil hole is practically impossible with even a minimum amount of care on the part of the operator.

I claim:

1. In a bushing removing and replacing device of the character described, for use with bearings and bushings having corresponding oil holes, a base, a post member removably mountable on said base in vertical position, the top and bottom portions of said post constituting main cylindrical sections having a diameter approximately equal to the internal diameter of the bushings, a cylindrical shoulder on said post separating said main sections, the diameter of said shoulder being approximately equal to the external diameter of the bushings, and a pair of oil hole guides in said main sections respectively, positioned in vertical alignment with each other, said guides located a distance above the top of said base and the top of said shoulder respectively equal to the spacing of the bushing oil hole from the end of the bushing, each of said guides consisting of an element movable radially in said post, having a rounded external portion of approximately the same maximum diameter as a bushing oil hole, spring means normally causing said element to extend a slight maximum distance out beyond the surface of said post but permitting said element to be easily pushed back into said post against the force of said spring means, whereby when a replacement bushing is slid onto said bottom main section of said post and said post set up on said base, and a bearing with an old bushing is slid onto said top main section, the turning of said replacement bushing and of said bearing and old bushing on said post until the bushing oil holes register with said guides respectively will cause said replacement bushing oil hole to be in exact vertical alignment with said bearing oil hole.

2. A bushing removing and replacing device of the character described, for use with bearings and bushings having corresponding oil holes, comprising a base, an integral post member removably mountable on said base in vertical position, the top and bottom portions of said post constituting main cylindrical sections having a diameter approximately equal to the internal diameter of the bushings, a cylindrical shoulder on said post separating said main sections, the diameter of said shoulder being approximately equal to the external diameter of the bushings, a pair of oil hole guides in said main sections respectively, positioned in vertical alignment with each other, said guides located a distance above the top of said base and the top of said shoulder respectively equal to the spacing of the bushing oil hole from the end of the bushing, each of said guides consisting of a stud slidably mounted in a channel extending diametrically through said post, the diameter of said channel being reduced near one end to produce an internal shoulder, the diameter of said reduced end corresponding to the diameter of a bushing oil hole, said stud having a rounded knob-like outer portion adapted to extend through said reduced end of said channel and to extend slightly out on the post surface when in maximum outward position, a threaded plug in the opposite end of said channel, a spring in said channel under slight compression between said plug and said stud permitting said stud to be easily pushed inwardly against the force of said spring, whereby when a replacement bushing is slid onto said bottom main section of said post and said post set up on said base, and a bearing with an old bushing is slid onto said top main section, the turning of said replacement bushing and of said bearing and old bushing on said post until the bushing oil holes register with said guides respectively will cause said replacement bushing oil hole to be in exact vertical alignment with said bearing oil hole, and means for forcibly moving said bearing down from said old bushing and over said new bushing.

BERT C. HAMILTON.

REFERENCES CITED

The following references are of record in the file of this patent:

UNITED STATES PATENTS

| Number | Name | Date |
|---|---|---|
| 389,335 | Spear | Sept. 11, 1888 |
| 1,422,067 | Abegg | July 11, 1922 |
| 1,533,619 | Thompson | Apr. 14, 1925 |
| 1,736,529 | Goeller | Nov. 19, 1929 |
| 1,834,918 | Altvater | Dec. 8, 1931 |
| 1,927,844 | Pfauser | Sept. 26, 1933 |
| 1,955,728 | Allen | Apr. 24, 1934 |
| 1,981,925 | Russell | Nov. 27, 1934 |
| 1,987,677 | Glassford | Jan. 15, 1935 |
| 2,430,733 | Paxson | Nov. 11, 1947 |
| 2,497,498 | Hamilton | Feb. 14, 1950 |